United States Patent
Pirzada et al.

(10) Patent No.: US 7,551,641 B2
(45) Date of Patent: Jun. 23, 2009

(54) SYSTEMS AND METHODS FOR DISTRIBUTION OF WIRELESS NETWORK ACCESS

(75) Inventors: Fahd B. Pirzada, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 659 days.

(21) Appl. No.: 11/189,280

(22) Filed: Jul. 26, 2005

(65) Prior Publication Data

US 2007/0025246 A1   Feb. 1, 2007

(51) Int. Cl.
*H04L 12/28* (2006.01)
*H04L 12/56* (2006.01)

(52) U.S. Cl. .................. 370/465; 370/466; 370/467; 370/401

(58) Field of Classification Search .............. 370/465, 370/466, 467, 401, 352–356
See application file for complete search history.

(56) References Cited

U.S. PATENT DOCUMENTS

| | | | |
|---|---|---|---|
| 5,933,420 | A | 8/1999 | Jaszewski et al. |
| 6,031,825 | A | 2/2000 | Kaikuranta et al. |
| 6,094,436 | A | 7/2000 | Runaldue et al. |
| 6,208,629 | B1 | 3/2001 | Jaszewski et al. |
| 6,373,848 | B1 | 4/2002 | Allison et al. |
| 6,560,234 | B1 * | 5/2003 | Ben-Michael et al. ....... 370/401 |
| 6,694,141 | B1 | 2/2004 | Pulkkinen et al. |
| 6,697,013 | B2 | 2/2004 | McFarland et al. |
| 6,810,520 | B2 | 10/2004 | Lu et al. |
| 6,834,045 | B1 | 12/2004 | Lappetelainen et al. |
| 2002/0025778 | A1 | 2/2002 | Lee |
| 2002/0059453 | A1 | 5/2002 | Eriksson et al. |
| 2002/0061031 | A1 | 5/2002 | Sugar et al. |
| 2002/0155811 | A1 | 10/2002 | Prismantas et al. |
| 2002/0181418 | A1 | 12/2002 | Awater et al. |
| 2002/0188723 | A1 | 12/2002 | Choi et al. |
| 2003/0198200 | A1 | 10/2003 | Diener et al. |

(Continued)

FOREIGN PATENT DOCUMENTS

EP   1207654 A2   5/2002

(Continued)

OTHER PUBLICATIONS

Search Report, Application No. 200604304-6, Dec. 22, 2006, 6 pgs.

(Continued)

*Primary Examiner*—Edan Orgad
*Assistant Examiner*—Chuong T Ho
(74) *Attorney, Agent, or Firm*—O'Keefe, Egan, Peterman & Enders LLP (57) ABSTRACT

Systems and methods for distribution of wireless network access using a common media access control (MAC) architecture. In one embodiment, a platform architecture may be provided for high speed Broadband Wireless Access (BWA) service termination using a common MAC architecture and router functionality, e.g., an integrated router and firewall service may be provided to a local WLAN network, leveraging a common orthogonal frequency division multiplexing (OFDM)-based MAC architecture for both the BWA and WLAN functionality. Such a common MAC architecture may be implemented to optimize the performance and throughput between the broadband wireless ISP data service and localized WLAN network.

13 Claims, 3 Drawing Sheets

U.S. PATENT DOCUMENTS

| | | | |
|---|---|---|---|
| 2004/0116075 A1 | 6/2004 | Shoemake et al. | |
| 2004/0125775 A1 | 7/2004 | Rios | |
| 2004/0152416 A1 | 8/2004 | Dahl | |
| 2004/0196812 A1 | 10/2004 | Barber et al. | |
| 2004/0199645 A1* | 10/2004 | Rouhi | 709/227 |
| 2004/0264394 A1 | 12/2004 | Ginzburg et al. | |
| 2005/0003796 A1 | 1/2005 | Kashiwase | |
| 2005/0025182 A1* | 2/2005 | Nazari | 370/469 |
| 2005/0074019 A1 | 4/2005 | Handforth et al. | |
| 2005/0147071 A1 | 7/2005 | Karaoguz et al. | |
| 2005/0170776 A1* | 8/2005 | Siorpaes | 455/41.2 |
| 2005/0259619 A1* | 11/2005 | Boettle et al. | 370/331 |
| 2006/0029028 A1* | 2/2006 | Kim et al. | 370/338 |
| 2006/0160536 A1* | 7/2006 | Chou | 455/435.1 |
| 2007/0002742 A1* | 1/2007 | Krishnaswamy et al. | 370/235 |

FOREIGN PATENT DOCUMENTS

| | | |
|---|---|---|
| EP | 1480388 A2 | 4/2004 |
| GB | 2308789 A | 7/1997 |
| GB | 2391137 A1 | 1/2004 |
| GB | 2416462 A | 1/2006 |
| WO | WO2004/027635 A1 | 4/2004 |
| WO | WO2004/036770 A2 | 4/2004 |
| WO | WO2004/039111 A1 | 5/2004 |
| WO | WO2004/088886 A2 | 10/2004 |
| WO | WO2004/105320 A1 | 12/2004 |
| WO | WO2004/107779 A2 | 12/2004 |
| WO | WO2005/008938 A2 | 1/2005 |

OTHER PUBLICATIONS

Rangnekar et al., "Multiple Channel Scheduling In UWB Based IEEE 802.15.3 Networks" IEEE Computer Society, First International Conference On Broadband Networks, 2004, 2 pgs.

Wi-Fi, Webopedia.com, 1 pg.

Neel et al., "Wireless, Wireless Everywhere And Now It Starts To Think", EE Times On Line, http://eetimes.com/consumer/showArticle.jhtml?articleID=51200473, Dated Nov. 1, 2004, Printed from Internet May 4, 2005, 8 pgs.

"IEEE 802.16' And WiMax, Broadband Wireless Access For Everyone", Intel White Paper, 2003, 8 pgs.

"IEEE 802.16a Standard And WiMax Igniting Broadband Wireless Access", White Paper, Printed from Internet on May 4, 2005, 7 pgs.

See, "802.11h Helps WLANs Share Spectrum", NetworkWorldFusion, http://www.nwfusion.com/news/tech/2004/071904techupdate.html, printed from Internet Apr. 13, 2005, 7 pgs.

Cox, "Keep Track Of The 802.11 Alphabet Soup", TechWorld, http://www.techworld.com/mobility/features/index.cfm?FeatureID=1065, printed from Internet Feb. 20, 2005, 5 pgs.

Copending Application, "Systems And Methods For RF Spectrum Management", U.S. Appl. No. 11/124,587, filed May 6, 2005, 29 pgs.

Intel PRO/Wireless 5116 Broadband Interface, "Innovation For WiMax Fixed Wireless Broadband Platforms", Product Brief, Copyright 2005, Printed from Internet Jul. 25, 2005, 2 pgs.

Intel PRO/Wireless 5116 Broadband Interface, "Innovation For WiMax Fixed Wireless Broadband Platforms", Printed from Internet Jul. 25, 2005, http://www.intel.com/network/connectivity/products/wireless/prowireless_5116.htm, 2 pgs.

WiMax Broadband Wireless Access Technology, Connecting To Next Billion People, Printed from Internet Jul. 25, 2005, http:www.intel.com/netcomms/technologies/wimax/index.htm, 2 pgs.

Search Report, GB0613480.3, Oct. 10, 2006.

Search Report, GB0803548.7, Apr. 2, 2008, 2 pgs.

Search Report, FR0606331; Dec. 8, 2008, 1 pg.

* cited by examiner

SYSTEMS AND METHODS FOR DISTRIBUTION OF WIRELESS NETWORK ACCESS

BACKGROUND OF THE INVENTION

1. Field of the Invention

This invention relates generally to wireless network communications, and more particularly to distribution of wireless network access.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, broadband internet service provider (ISP) service access is primarily based on one of two architectures: cable modem or digital subscriber line (DSL) service. Typically, the broadband service is terminated in a standalone modem device or a combination modem-router device with local content distribution over Ethernet or wireless local area network (WLAN) network technologies to other attached devices and platforms.

Wireless metropolitan area network technology (WMAN) is emerging as an alternative to cabled access networks such as fiber optic links, coaxial systems using cable modems and DSL links. In the industry, scientific and medical (ISM) band, broadband wireless access (BWA) is emerging as a broadband service for consumers and backhaul access for public hot spots. Broadband Wireless Access has been standardized within the IEEE 802.16a standard, which has been introduced as a metropolitan area network to link 802.11 hotspots to the internet. This standard offers tens of megabits of throughput over distance of up to 20 kilometers, and the ability to make connections without having a direct line of sight. Because of its extended range, 802.16a systems should consume more power and require more advanced antenna systems than typical WLAN applications, potentially interfering with wide scale adoption of the 802.16a standard in thin and light client hardware.

The initial deployment of 802.16a technology in many corporate/small business computing (SMB) environments will likely be over existing WLAN infrastructure. Currently, WLAN access points (APs) are managed by information technology (IT) administrators using an Ethernet link to the AP. Any updates to firmware/firewall are loaded seamlessly without routing over the external Internet. With IEEE 802.16a enabled APs, the management would have to be over wireless link from either a client associated to the AP or the Internet Service Provider servicing the 802.16a node (for true wireless deployment without Ethernet). The first scenario is cumbersome and inefficient if multiple APs are deployed. The second scenario raises security and robustness issues because of routing outside the corporate network.

SUMMARY OF THE INVENTION

Disclosed herein are systems and methods for distribution of wireless network access (e.g., providing multi-network access for two or more networks having different networking protocols) using a common media access control (MAC) architecture. In one embodiment, the disclosed systems and methods may be implemented to provide a platform architecture for high speed Broadband Wireless Access (BWA) service termination using a common MAC architecture and router functionality. In such an embodiment, this common MAC architecture may be implemented, for example, to optimize the performance and throughput between a BWA wireless internet service provider (ISP) data service and a localized WLAN network. In one exemplary embodiment, an integrated router and firewall service may be provided to a local WLAN network, leveraging a common orthogonal frequency division multiplexing (OFDM)-based MAC architecture for both the BWA and WLAN functionality.

Benefits that may be realized from the implementation of the disclosed systems and methods include, but are not limited to, cost benefits of the MAC architecture with further extensions for shared physical layer (PHY) application specific integrated circuits (ASICs). The extensibility and routing feature capabilities of the disclosed architecture may be advantageously implemented, for example, with ultra wide band (UWB) technology for network environments ranging from local area data-based computing networks to consumer entertainment (CE) based networks, e.g., forming a key to the Digital Home architecture.

In one exemplary embodiment, the disclosed systems and methods may be implemented to provide one or more BWA (e.g., 802.16a) access points that service WLAN (e.g., 802.11 abgn WiFi) and/or WPAN (UWB, blue tooth) clients. In such an embodiment, an individual BWA access point may be configured with the ability to maintain association with existing legacy WLAN and/or WPAN APs in the vicinity. The disclosed systems and methods may be further implemented to provide an additional network layer between the BWA (e.g., 802.16a) backend and the WLAN/WPAN (802.11/UWB/BT) front end that allows support for firmware updates and firewall deployment, with the ability to accept changes to this new network layer through association with legacy WLAN APs. For example, a BWA (e.g., 802.16a) AP may be associated with APs from an existing corporate WLAN as a special client. Any updates being serviced to the corporate WLAN APs may be routed to the associated BWA AP. The BWA AP may be enabled to use these updates to modify administrative features e.g., port forwarding, IP blocking, encryption keys, etc.

In one example implementation of the above-described embodiment, an additional network layer between the BWA (e.g., 802.16a) backend and the WLAN/WPAN (802.11/UWB/BT) front end may be provided that appears like an Ethernet client to the existing corporate network. The additional network layer may be configured to have an abstract Ethernet address that may be maintained in IT routing tables, e.g., so as to allow administrators to add and delete BWA APs using existing network management tools, and at the same time allowing secure and centralized management of BWA APs without any routing outside the corporate network. Thus, management communications (e.g., firmware updates, firewall configurations, changes to administrative features, etc.) may be provided over a front end communication link to a BWA AP from a WLAN AP, rather than over a back end communication link or from a management client associated with the BWA AP.

Examples of features and/or benefits that may be implemented in combination using the disclosed systems and methods include, but are not limited to, seamless WMAN-to-WLAN translation; native quality of service (QoS) for voice, data and multimedia; omni-directional antennas for Mesh Networking; multi-channel selection, allocation and control; increased network capacity with meshed nodes; security and authentication; and protocol independent operations, e.g., Ethernet, Internet Protocol Version 6 (IPv6), asynchronous transfer mode (ATM), point to point protocol over Ethernet (PPPoE), etc. Common firewall architecture features and/or benefits may also be realized or implemented in the practice of the disclosed systems and method including, but not limited to, client and application authentication; configuration management; policies and profiles; etc. In addition, network scalability and extensibility may be provided, e.g., for 802.11n, UWB and/or other network protocols. Switch and routing operations features that may be realized include, but are not limited to, L2/L3+ non-blocking architecture; wire speed between WMAN/WLAN; native termination for virtual private networks (VPNs); virtual local area network (VLAN) support for heterogeneous applications and/or devices; mesh local node support and control, etc.

In one respect, disclosed herein is a network communication method that includes providing wireless communication between two or more wireless networks at the media access control (MAC) software layer. In this method, a first one of the two or more wireless networks may include a wireless network having a first networking protocol, a second one of the two or more wireless networks may include a wireless network having a second networking protocol, and the first networking protocol may be different than the second networking protocol.

In another respect, disclosed herein is an information handling system that includes first network communication circuitry configured to communicate with a first wireless network having a first networking protocol, second network communication circuitry configured to communicate with a second wireless network having a second networking protocol, and shared media access control (MAC) circuitry coupled to communicate with physical (PHY) interfaces of each of the first network communication circuitry and the second network communication circuitry. The second networking protocol may be different than the first networking protocol.

In another respect, disclosed herein is a multi-network common access point that includes an information handling system configured to provide wireless communication between two or more wireless networks at the media access control (MAC) software layer. A first one of the two or more wireless networks may include a wireless network having a first networking protocol, a second one of the two or more wireless networks may include a wireless network having a second networking protocol, and the first networking protocol may be different than the second networking protocol.

DESCRIPTION OF ILLUSTRATIVE EMBODIMENTS

Figure 1:
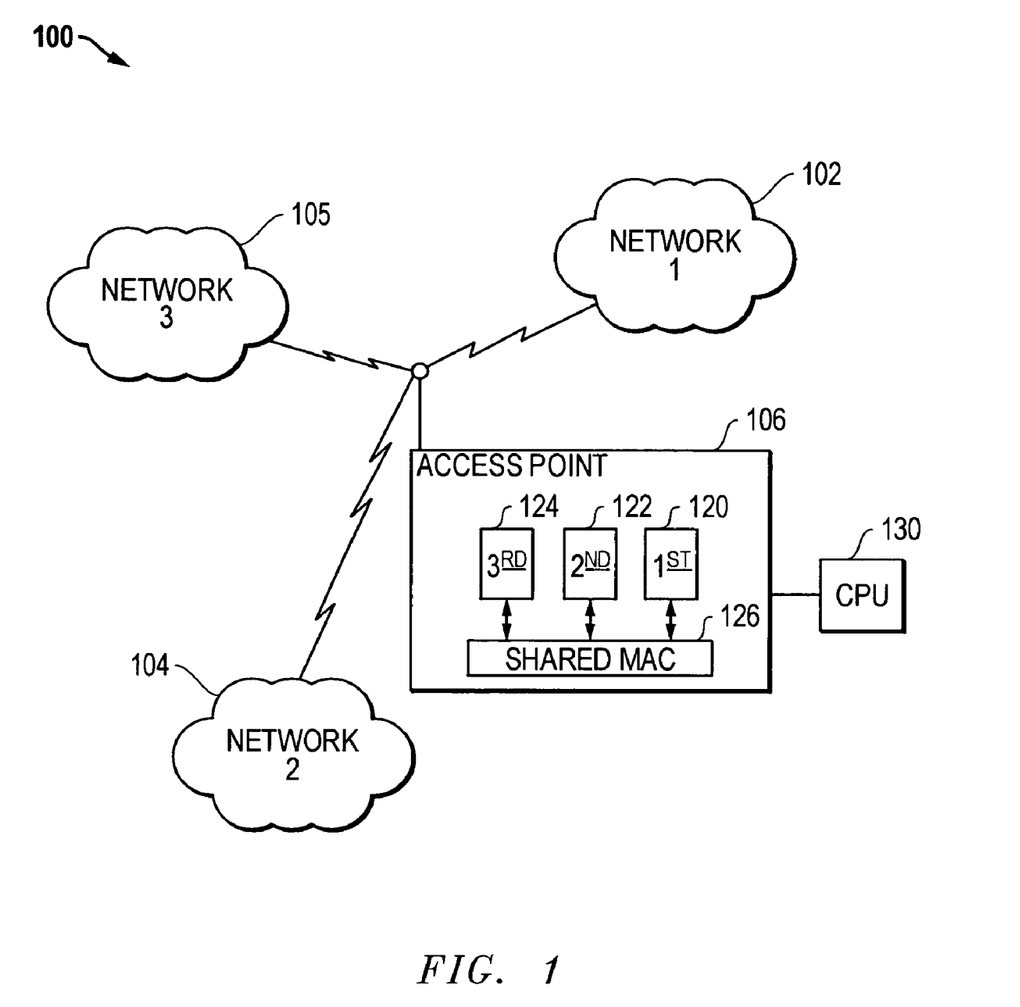
FIG. 1 is a simplified block diagram of a wireless networking environment according to one exemplary embodiment of the disclosed systems and methods.

FIG. 1 is a block diagram of a wireless networking environment 100 as it may be implemented according to one embodiment of the disclosed systems and methods to distribute network access among multiple separate networks having different networking protocols. As shown, wireless networking environment 100 includes an information handling system 106 configured as a multi-network common access point for three exemplary different types of wireless networks 102, 104 and 105, although it will be understood that the disclosed systems and methods may be implemented in other embodiments as a common access point for any two or more separate networks of any configuration and/or access control. Specific examples of such networks include, but are not limited to, WLAN based technologies such as 802.11 WiFi (2.4 GHz and 5.0 GHz); WPAN based technologies such as Bluetooth (2.4 GHz) and UWB (3.1-10.6 GHz); WWAN based technologies such as GSM/EDGE, HSDPA, W-CDMA, CDMA-2000 (800-900 MHz, 1800-1900 MHz and 2.1 GHz); and WMAN based technologies such as 802.16 WiMax (2-11 GHz), etc. In one exemplary embodiment, information handling system 106 may be a portable information handling system such as a notebook computer.

In the illustrated exemplary embodiment of FIG. 1, network 102 represents a first wireless network (e.g., WWAN or WMAN) of devices capable of relatively high bandwidth and relatively long range communication, wireless network 104 represents a second network (e.g., WLAN) of devices capable of relatively low bandwidth and relatively short range communication, and wireless network 105 a third network (e.g., WPAN) of devices capable of relatively high bandwidth and relatively short range communication. In this embodiment, wireless network 102 may be further characterized as an external network (e.g., external Internet or other public domain network), wireless network 104 may be further characterized as an internal network (e.g., corporate or home Intranet or other network of managed configuration and user access), and wireless network 105 may be further characterized as a peripheral connection network configured to connect peripherals (e.g., video display devices, audio reproduction devices, projection devices, printer devices, displays, mice, keyboards, optical drives, external storage devices, webcams, etc.) to one or more network nodes of wireless network 105.

As shown in FIG. 1, information handling system 106 includes first network communication circuitry 120 configured to communicate with first network 102, second network communication circuitry 122 configured to communicate with second network 104 and third network communication circuitry 124 configured to communicate with third network 105. In the illustrated embodiment, information handling system 106 also includes shared MAC circuitry 126 coupled to communicate with physical (PHY) interfaces of each of network communication circuitries 120, 122 124 in a manner that allows direct communication at the MAC software layer between networks 102, 104 and/or 105. As will be described further herein, this MAC layer communication capability may be implemented in a variety of embodiments to realize one or more benefits of the disclosed systems and methods by bridging two or more network interfaces at the MAC software processing layer.

Figure 2:
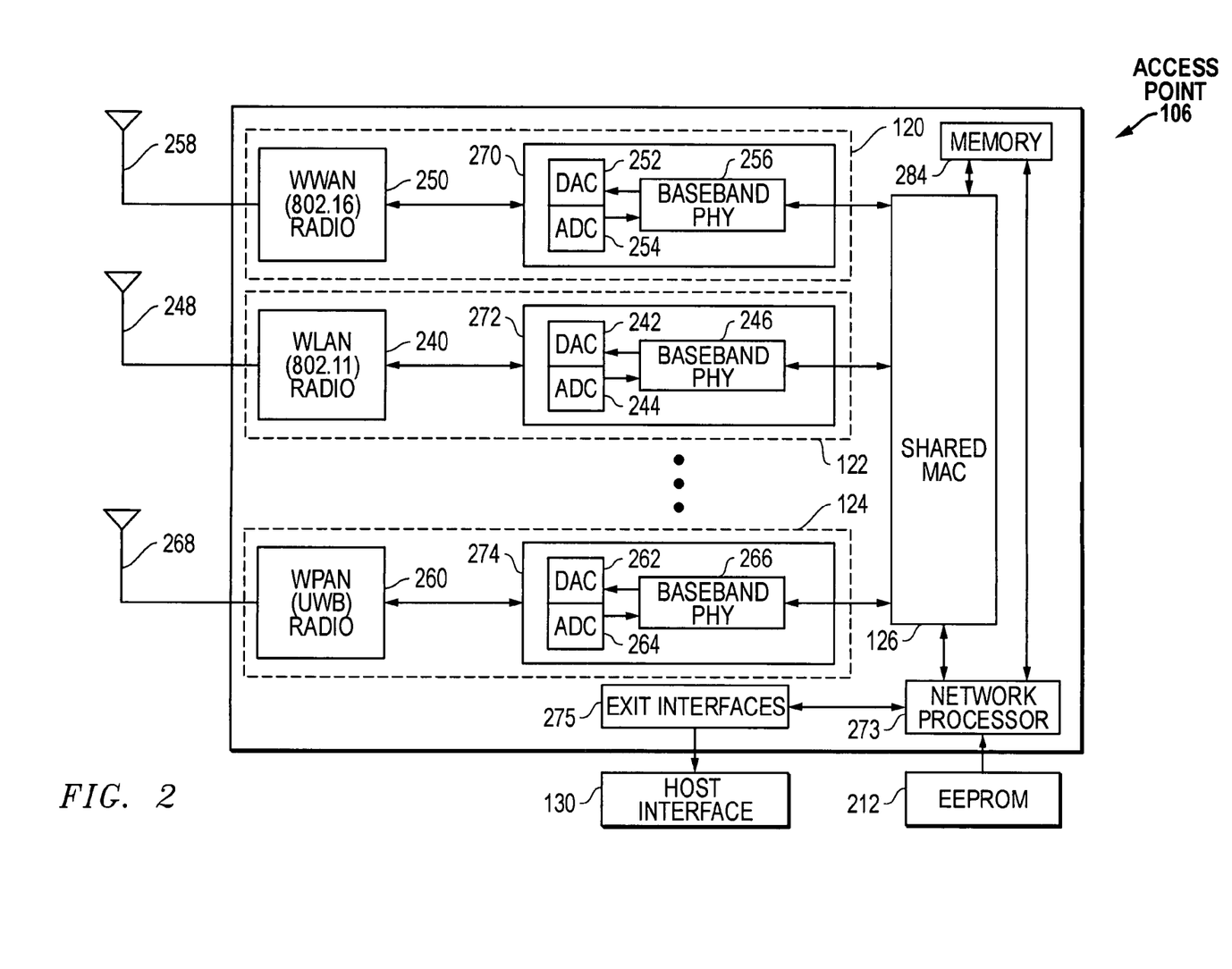
FIG. 2 is a simplified block diagram of an information handling system configured as a common access point according to one exemplary embodiment of the disclosed systems and methods.

FIG. 2 is a simplified block diagram of information handling system 106 of FIG. 1, as it may be configured as a common access point for multiple networks, e.g., networks 102, 104 and 105. As illustrated in FIG. 2, first network communication circuitry 120 includes first network radio transceiver circuitry 250 (e.g., WWAN radio transceiver circuitry), second network communication circuitry 122 includes second network radio transceiver circuitry 240 (e.g., WLAN radio transceiver circuitry) and third network communication circuitry 124 includes third network radio transceiver circuitry 260 (e.g., WPAN radio transceiver circuitry) that are coupled to receive and transmit wireless network radio frequency (RF) signals using a corresponding antenna 258, 248 or 268, respectively. It will be understood that FIG. 2 is exemplary only, and that an information handling system may be configured in other embodiments as a common access point for two networks, or as common access point for more than three networks, the latter case being represented by the dots between second network communication circuitry 122 and third network communication circuitry 124 in FIG. 2.

As shown in FIG. 2, each of network communication circuitries 120, 122 and 124 includes a respective network signal processing component 270, 272 or 274 that is coupled between a respective radio transceiver circuitry 250, 240 or 260 and shared MAC circuitry 126. Each of network signal processing components 270, 272 or 274 includes an analog to digital converter (ADC) 252, 242 or 262, a digital to analog converter (DAC) 254, 244 or 264 and baseband circuitry 256, 246 or 266 that are together provided to receive analog network communication signals from radio transceiver circuitry 250, 240 or 260 and to provide corresponding digital network communication signals to shared MAC circuitry 126, and to receive digital network communication signals from shared MAC circuitry 126 and to provide corresponding analog network communication signals to radio transceiver circuitry 250, 240 or 260 in the manner illustrated. In this regard, each of radio transceiver circuitry 250, 240 or 260 provides analog network communication signals to one of network signal processing components 270, 272 or 274 that is based on network RF signals received by a corresponding antenna 258, 248 or 268, and receives analog communication signals from one of network signal processing components 270, 272 or 274 for transmission as network RF signals by a corresponding antenna 258, 248 or 268. Although information handling system 106 is configured in this embodiment as a common access point having radio transceiver circuitry and associated network signal processing circuitry for RF network communications, it is also possible that shared MAC circuitry of a common access point may also be coupled to shared MAC circuitry suitable for wired network communication with one or more networks.

As further illustrated in FIG. 2, information handling system 106 also includes network processor 273 that communicates between shared MAC circuitry 126 and external interfaces 275. External interfaces 275 may be coupled to any one or more external host devices 130 (e.g., microprocessor, microcontroller, information handling system, etc.) that are suitable for exchanging (i.e., receiving and/or providing) network communications with shared MAC circuitry 126 via network processor 273. Examples of tasks that may be performed by external host device/s 130 include, but are not limited to, providing graphical user interface/command-line interface for configuration settings, providing bus interface (e.g. USB, PCI Express, etc.) to connect external devices, providing scalability to attach another instance of a network interface (e.g., Bluetooth) and providing administrative access to the underlying network interfaces, etc. It will be understood, however, that communications may be established between any two or more of first network 102, second network 104 and/or third network 105 via network communication circuitries 120, 122 and/or 124 directly through MAC circuitry 126 to bridge network interfaces of these networks at the MAC software processing layer without any further processing of higher software layers using network processor 273.

In one embodiment, network processor 273 may be provided and configured with network software stack processing circuitry that is suitable for processing information flow through underlying network layers and/or network communications received or provided to MAC circuitry 126. FIG. 2 also illustrates memory 284 that may be coupled to shared MAC circuitry 126 and to network processor 273 for purposes of storing networking software stack and/or configuration settings, etc. Also shown is external electrically erasable programmable read-only memory (EEPROM) 212 that may be present for purposes of storing BIOS information and/or firmware for the networking devices, etc.

In one exemplary embodiment a multi-network common access point, such as information handling system 106 of FIG. 2, may be implemented to distribute wireless network access and communication between two or more networks (e.g., networks 102, 104 and 105 of FIG. 1) using the common media access control (MAC) architecture provided by shared MAC circuitry 126. For example, information handling system 106 may be implemented as a router (with optional firewall capability) to provide termination for communications between first network 102 and second network 104 and/or third network 105 at the shared MAC level. In such an embodiment, the common MAC architecture may be so employed to optimize the performance and throughput between the individual networks by reducing software layer processing time and complexity.

Figure 3:
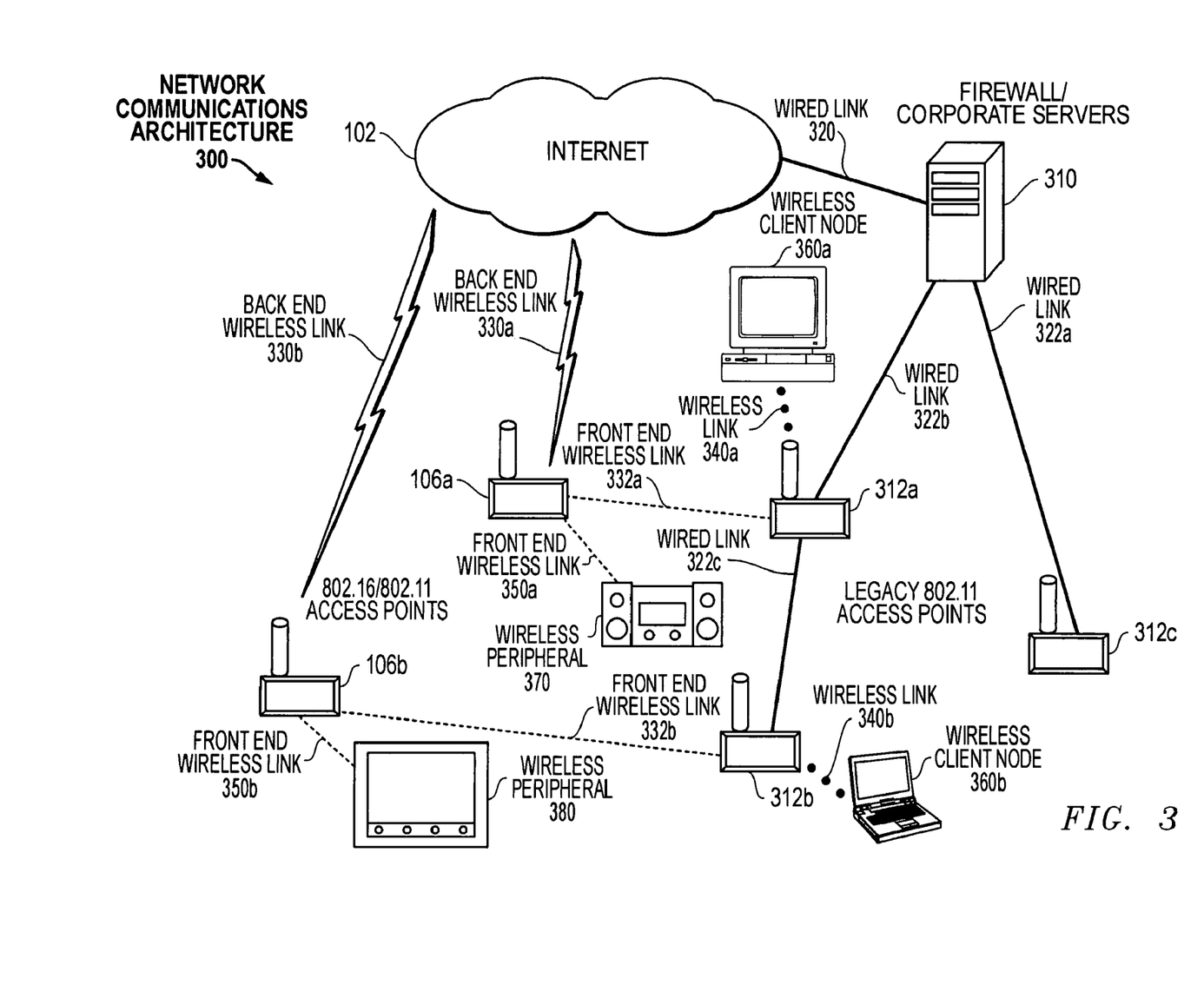
FIG. 3 illustrates a network communications architecture according to one exemplary embodiment of the disclosed systems and methods.

FIG. 3 illustrates one exemplary embodiment of a network communications architecture 300 that may be implemented according to one embodiment of the disclosed systems and methods. As shown, network architecture 300 includes an information handling system 310 configured to provide wired access for an internal network (e.g., home network or corporate Intranet) that includes wireless access points 312a, 312b and 312c (e.g., IEEE 802.11 standard compliant devices from the same or different manufacturer/s). In this regard, information handling system 310 may be configured, for example, as a wired network server to an internal corporate Intranet network or as a cable modem that serves an internal home network. In such an embodiment, information handling system 310 may be in wired communication via wired link 320 with external Internet network 102 and be registered with an internet service provider (ISP) of external Internet network 102. As shown, information handling system 310 is also in communication via wired links 322a, 322b and 322c with wireless access points 312a, 312b and 312c, respectively. Wired communication links 320, 322a, 322b and 322c may be, for example, wired Ethernet communication links or other suitable wired network communication links. Besides serving the internal network, information handling system 310 may also be configured to perform other functions, for example, configured as a firewall for the internal network.

As shown, internal network access points 312a, 312b and 312c are configured to wirelessly communicate via wireless communication links (e.g., 802.11 WLAN links) with one or more wireless client device nodes of the internal network. In this regard, FIG. 3 shows internal wireless network access point 312a in wireless communication with wireless client node 360a (e.g., information handling system configured as a desktop computing device) via wireless communication link 340a, and wireless network access point 312b in wireless communication with wireless client node 360b (e.g., information handling system configured as a portable notebook computing device) via wireless communication link 340b of the internal network.

The exemplary embodiment of FIG. 3 also includes two information handling systems 106a and 106b that are configured in the form of multi-network common access points that are in direct wireless communication via respective backend wireless links 330a and 330b (e.g., 802.16a BWA links) to external network 102. In this embodiment, each of information handling systems 106a and 106b are capable of communication with any 802.11 standard compliant device, and are thus capable of wireless communication with each of network access points 312a, 312b and 312c, when in suitable wireless communication range with these devices.

As shown in FIG. 3, information handling system 106a is also in wireless communication via wireless link 332a (e.g., 802.11abgn WiFi WLAN link) with internal network access point 312a of the internal network, and information handling system 106b is also in wireless communication via wireless link 332b (e.g., 802.11abgn WiFi WLAN link) with internal network access point 312b of the same internal network. In the illustrated embodiment, information handling system 106a is further in wireless communication via wireless link 350a (e.g., UWB WPAN link) with audio reproduction peripheral 370 of a peripheral connection network, and information handling system 106b is further in wireless communication via wireless link 350b (e.g., UWB WPAN link) with wide screen display peripheral 380 of the peripheral connection network. Thus, each of information handling systems are configured to communicate with one or more nodes (e.g., access points and/or other devices) of an internal network, while at the same time directly communicating via backend connection with an external network.

As illustrated in FIG. 3, information handling systems 106a and 106b may be configured as multi-network common access points for BWA (e.g., 802.16a) network access, and that service WLAN (e.g., 802.11 abgn WiFi) and/or WPAN (UWB, blue tooth) clients. In such an embodiment, individual information handling systems 106a and 106b may be configured with the ability to maintain association with existing legacy WLAN access points 312 and/or WPAN access points that may be in the vicinity. In this regard, it will be understood that the illustrated embodiment of FIG. 3 is exemplary only, and that information handling systems 106a and/or 106b may communicate directly with wireless client nodes (e.g., wireless client nodes 360a and/or 360b) when in direct wireless (e.g., WLAN) communication range with such wireless client nodes. Similarly, information handling systems 106a and/or 106b may communicate with wireless peripheral devices (e.g., wireless peripherals 370 and/or 380) via peripheral network access point/s (e.g., WPAN wireless access points not shown in FIG. 3), for example, when these wireless peripheral devices are outside of direct WPAN communication range with information handling systems 106a and/or 106b.

In one exemplary embodiment of the disclosed systems and methods, a multi-network common access point may be optionally configured with an additional network layer implemented between two or more individual network communication circuitries in order to facilitate and/or modify characteristics of communications between the multiple networks. For example, referring to the embodiment of FIG. 2, an additional network layer may be implemented in network signal processing hardware components (e.g. 270, 272 or 274) or software (e.g., in the memory 248 or through host interface 130) of an information handling system 106 between a BWA backend wireless link 330 provided by first network communication circuitry 120 and WLAN and/or WPAN front end wireless links 332 and 350 provided by second network communication circuitry 122 and/or third network communication circuitry 124, respectively. Such an additional network layer may be configured to allow support for firmware updates and firewall deployment, with the ability to accept changes to this additional network layer, for example, through communication from other access points, e.g., such as access points 312 of the exemplary embodiment of FIG. 3.

Still referring to FIG. 3, access points 312 may comprise legacy access points that form a part of an existing corporate WLAN network, and information handling systems 106 may be configured as BWA multi-network common access points that are associated with legacy access points 312. In such an embodiment, any updates being serviced to the legacy corporate WLAN access points 312 may be routed to the associated BWA access point information handling systems 106, which in turn may be configured to use these updates to modify administrative features, e.g., port forwarding, IP blocking, encryption keys, etc.

In one example implementation of the above-described embodiment, an additional network layer between the BWA (e.g., 802.16a) backend links 330 and WLAN front end wireless links 332 may be provided that is optionally configured to appear like an Ethernet client to the existing corporate network. In such an exemplary embodiment, this additional network layer may be configured, for example, to have an abstract Ethernet address that may be maintained in IT routing tables, e.g., so as to allow administrators to add and delete information handling systems 106 (configured as BWA multi-network common access points) through front end wireless links 332 using existing network management tools, and at the same time allowing secure and centralized management of information handling systems 106 without any routing outside the corporate network.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A network communication method, comprising providing wireless communication between two or more wireless networks at a media access control (MAC) software layer through a separate and different baseband circuitry provided for each of said two or more wireless networks; wherein a first one of said two or more wireless networks comprises a wireless network having a first networking protocol, and a second one of said two or more wireless networks comprises a wireless network having a second networking protocol, said first networking protocol being different than said second networking protocol;

wherein said first networking protocol is a broadband wireless access (BWA) networking protocol and wherein said second networking protocol is a wireless local area network (WLAN) networking protocol;

wherein said first network comprises an external public domain network wherein said second network comprises an internal network of managed configuration and user access; and wherein said method further comprises communicating with said first network via a back end communication link to said external public domain network from a wireless access point, and communicating with said second network via a front end communication link to said internal network of managed configuration and user access from said wireless access point; and wherein said first network comprises at least one first access point for said external public domain network; wherein said second network comprises at least one separate second access point for said internal network of managed configuration and user access; and wherein said method further comprises:

providing an additional network layer between said front end communication link and said back end communication link and between said separate and different baseband circuitry that is provided for each of said two or more wireless networks and said separate and different baseband circuitry that is provided for each other of said two or more wireless networks, said additional network layer configured with an abstract Ethernet address maintained in a routing table, providing access for management communications from said at least one second access point for said internal network of managed configuration and user access through said additional network layer to said at least one first access point for said external public domain network across said front end communication link and not across said back end communication link, and wherein said management communications comprises at least one of a firmware update, firewall configuration, change to administrative feature, or a combination thereof.

2. The network communication method of claim 1, further comprising providing said wireless communication between said two or more wireless networks at the media access control (MAC) software layer using shared MAC circuitry.

3. The network communication method of claim 1, further comprising providing said wireless communication between the two or more wireless networks at the media access control (MAC) software layer within an information handling system configured as a multi-network common wireless access point.

4. The network communication method of claim 1, wherein said first networking protocol has a higher communication bandwidth than a communication bandwidth of said second networking protocol; and wherein said first networking protocol has a greater communication range than a communication range of said second networking protocol.

5. The network communication method of claim 1, wherein said first network comprises an external public domain Internet network; and wherein said second network comprises a corporate or home local area network.

6. The network communication method of claim 1, further comprising maintaining association with said at least one wireless access point for said second network; and receiving management communications over said front end communication link from said at least one second network wireless access point.

7. The network communication method of claim 1, further comprising updating firmware for an access point of a second one of said wireless networks through an access point of a first one of said wireless networks and through an additional network layer, said additional network layer being positioned between said separate and different baseband circuitry that is provided for each of said two or more wireless networks and said separate and different baseband circuitry that is provided for each other of said two or more wireless networks.

8. A multi-network common access point, comprising an information handling system configured to provide wireless communication between two or more wireless networks at a media access control (MAC) software layer through a separate and different baseband circuitry provided for each of said two or more wireless networks; wherein a first one of said two or more wireless networks comprises a wireless network having a first networking protocol, and a second one of said two or more wireless networks comprises a wireless network having a second networking protocol, said first networking protocol being different than said second networking protocol;

wherein said first networking protocol is a broadband wireless access (BWA) networking protocol; and wherein said second networking protocol is a wireless local area network (WLAN) networking protocol;

wherein said first network comprises an external public domain network; wherein said second network comprises an internal network of managed configuration and user access; wherein said information handling system is configured to communicate with said first network via a back end communication link to said external public domain network from said information handling system, and to communicate with said second network via a front end communication link to said internal network of managed configuration and user access from said information handling system; and wherein said multi-network common access point acts as a first access point for said external public domain network; wherein said second network comprises at least one separate second access point for said internal network of managed configuration and user access; and wherein said multi-network common access point further comprises:

an additional network layer between said front end communication link and said back end communication link and between said separate and different baseband circuitry that is provided for each of said two or more wireless networks and said separate and different baseband circuitry that is provided for each other of said two or more wireless networks, said additional network layer configured with an abstract Ethernet address maintained in a routing table, providing access for management communications from said at least one second access point for said internal network of managed configuration and user access through said additional network layer to said multi-network common access point for said external public domain network across said front end communication link and not across said back end communication link, and wherein said management communications comprises at least one of a firmware update, firewall configuration, change to administrative feature, or a combination thereof.

9. The multi-network common access point of claim 8, wherein said information handling system further comprises shared media access control (MAC) circuitry configured to provide said wireless communication between said two or more wireless networks at the MAC software layer.

10. The multi-network common access point of claim 8, wherein said first networking protocol has a higher communication bandwidth than a communication bandwidth of said second networking protocol; and wherein said first networking protocol has a greater communication range than a communication range of said second networking protocol.

11. The multi-network common access point of claim 8, wherein said first network comprises an external public domain Internet network; and wherein said second network comprises a corporate or home local area network.

12. The multi-network common access point of claim 8, wherein said information handling system is configured to receive management communications over said front end communication link from said at least one second network.

13. The multi-network common access point of claim 8, further comprising an additional network layer being positioned between said separate and different baseband circuitry that is provided for each of said two or more wireless networks and said separate and different baseband circuitry that is provided for each other of said two or more wireless networks; and wherein said additional network layer is configured to provide access for firmware updates to be provided for an access point of a second one of said wireless networks through an access point of a first one of said wireless networks.

* * * * *